(12) United States Patent
Baglioni et al.

(10) Patent No.: US 12,545,433 B2
(45) Date of Patent: Feb. 10, 2026

(54) LOCKING DEVICE FOR AN AIRCRAFT

(71) Applicant: LEONARDO S.P.A., Rome (IT)

(72) Inventors: Stefano Baglioni, Pomezia (IT); Maurizio Ribaudo, Pomezia (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/579,593

(22) PCT Filed: Jul. 22, 2022

(86) PCT No.: PCT/IB2022/056801
§ 371 (c)(1),
(2) Date: Jan. 16, 2024

(87) PCT Pub. No.: WO2023/002451
PCT Pub. Date: Jan. 26, 2023

(65) Prior Publication Data
US 2024/0327032 A1    Oct. 3, 2024

(30) Foreign Application Priority Data

Jul. 23, 2021  (EP) ..................................... 21425037
Jul. 19, 2022  (IT) ......................... 102022000015168

(51) Int. Cl.
*B64F 1/16* (2006.01)
*B64F 1/12* (2006.01)
(Continued)

(52) U.S. Cl.
CPC .................. *B64F 1/16* (2013.01); *B64F 1/12* (2013.01); *B64F 1/125* (2013.01); *B64U 10/17* (2023.01); *B64U 70/99* (2023.01)

(58) Field of Classification Search
CPC ... B64F 1/12; B64F 1/16; B64F 1/125; B64U 70/99
See application file for complete search history.

(56) References Cited

U.S. PATENT DOCUMENTS

| | | | |
|---|---|---|---|
| 4,105,241 A * | 8/1978 | Mee ......................... | B64G 4/00 294/74 |
| 9,862,504 B1 * | 1/2018 | Pounds ................. | B64F 1/0299 |
| 2018/0148170 A1 | 5/2018 | Stamatovski | |

FOREIGN PATENT DOCUMENTS

WO    2021010869 A1    1/2021

OTHER PUBLICATIONS

International Preliminary Report on Patentability for International Application No. PCT/IB2022/056801 mailed Jan. 16, 2023.
(Continued)

*Primary Examiner* — Richard G Davis
(74) *Attorney, Agent, or Firm* — Ballard Spahr LLP

(57) ABSTRACT

A locking device for an aircraft is described, comprising a body adapted to be fixed to a support surface, a first ring and a second ring rotatable the one with respect to the other with respect to a rotation axis between a first angular position and a second angular position. The first and second ring enclose an area for the landing of the aircraft and are contained within the body. The locking device also comprises a plurality of cables, which connect the first ring to the second ring. The locking device is positionable in an unlocking position, wherein the first and second ring are in the first angular position, the cables are spaced from said area; or in a locking position, wherein the first and second ring are in the second angular position and the cables occupy a region of the area, so as to cooperate in contact with the aircraft to constrain it with respect to the support surface.

9 Claims, 11 Drawing Sheets

(51) Int. Cl.
 *B64U 10/17* (2023.01)
 *B64U 70/99* (2023.01)

(56) References Cited

OTHER PUBLICATIONS

International Search Report and Written Opinion from International Application No. PCT/IB2022/056801 mailed Oct. 20, 2022.
Reply to Written Opinion for International Application No. PCT/IB2022/056801 filed Dec. 21, 2022.
Office Action for European Application No. 22754523.3 mailed May 9, 2025.

* cited by examiner

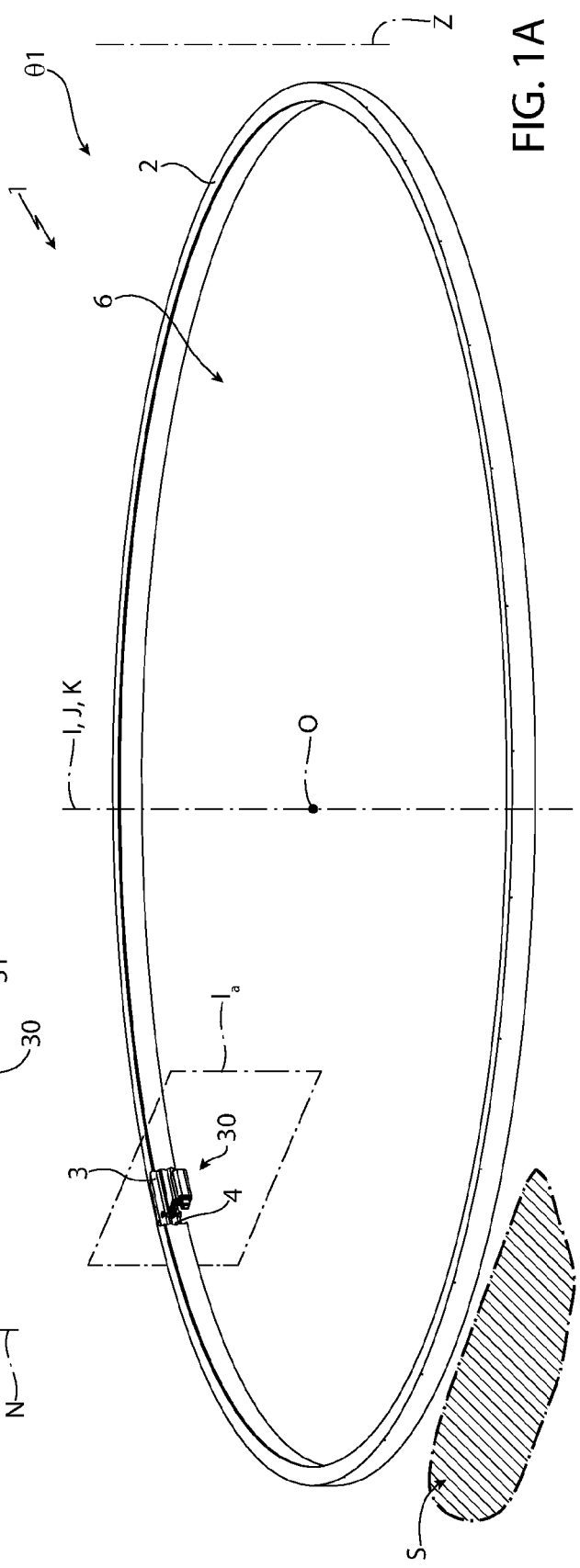
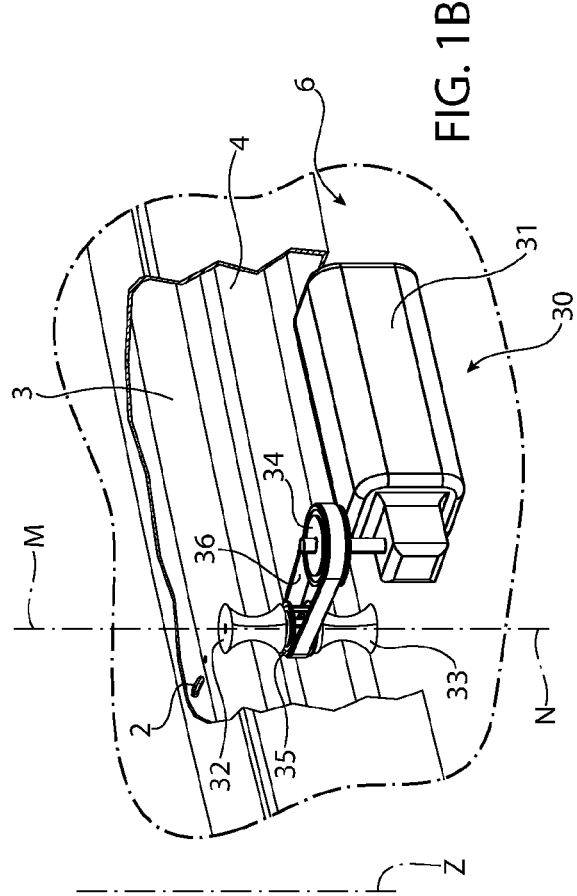

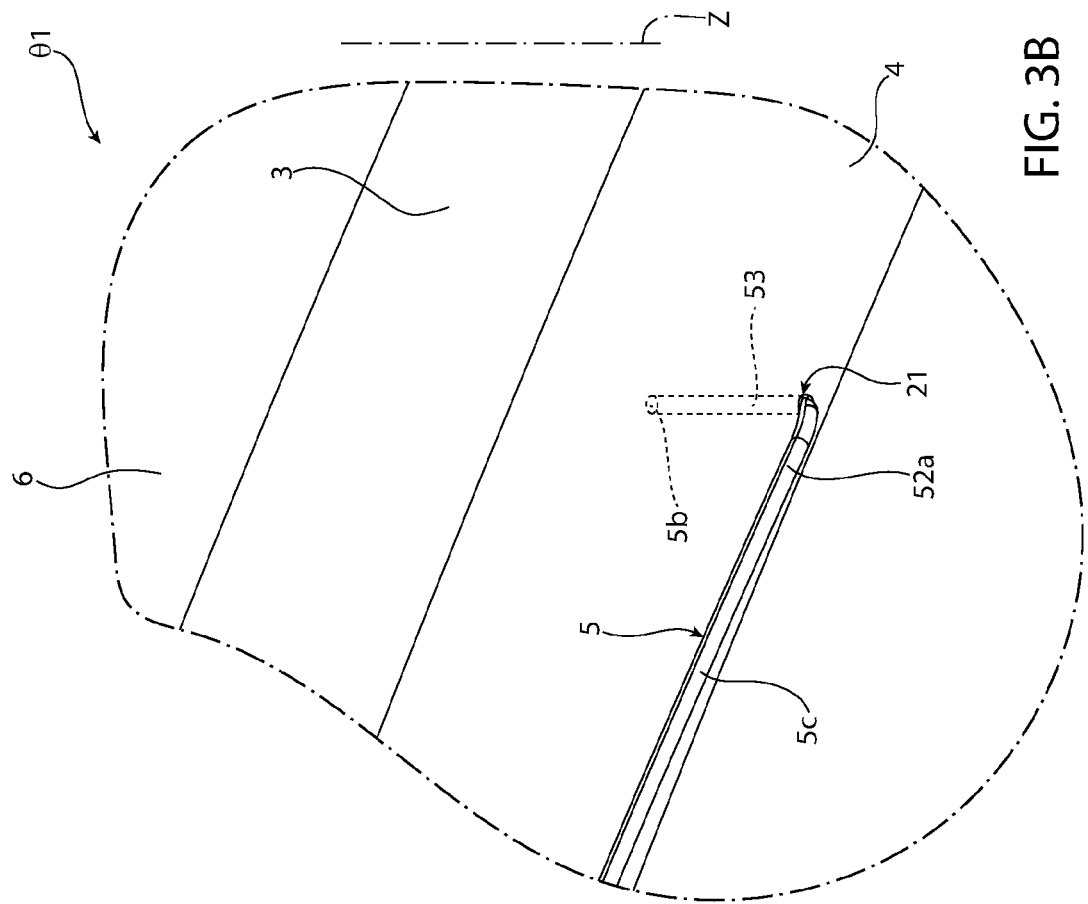
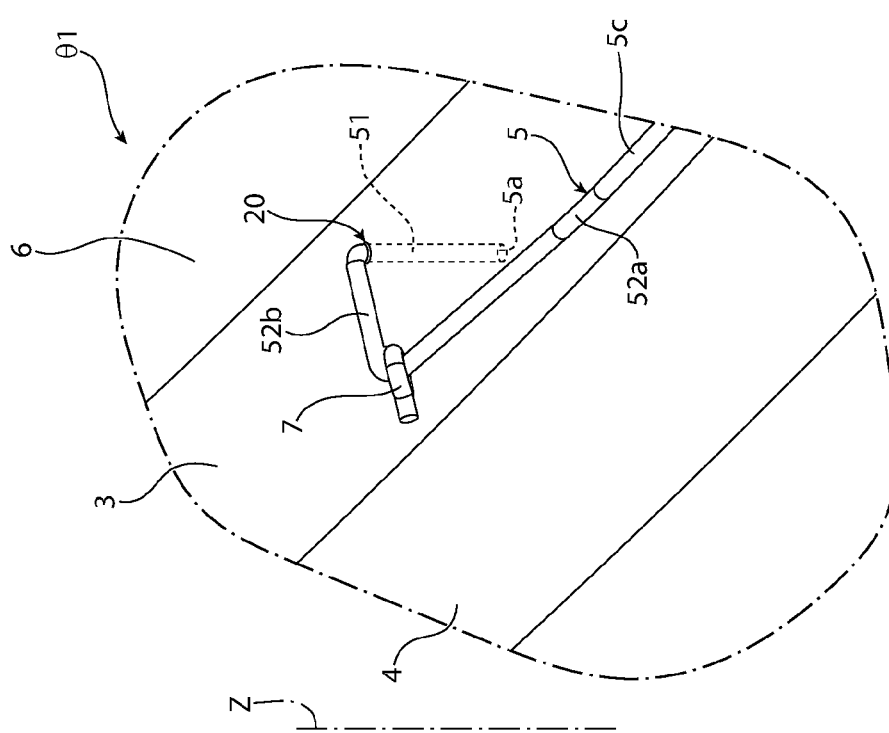

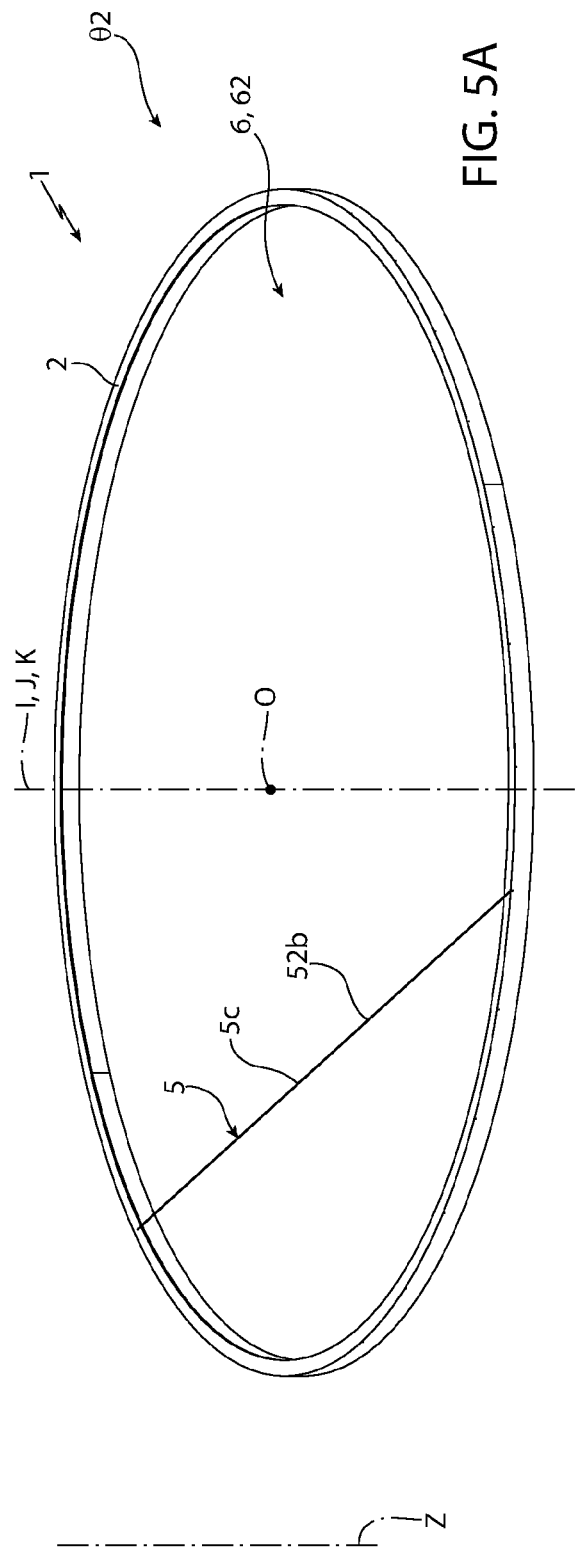
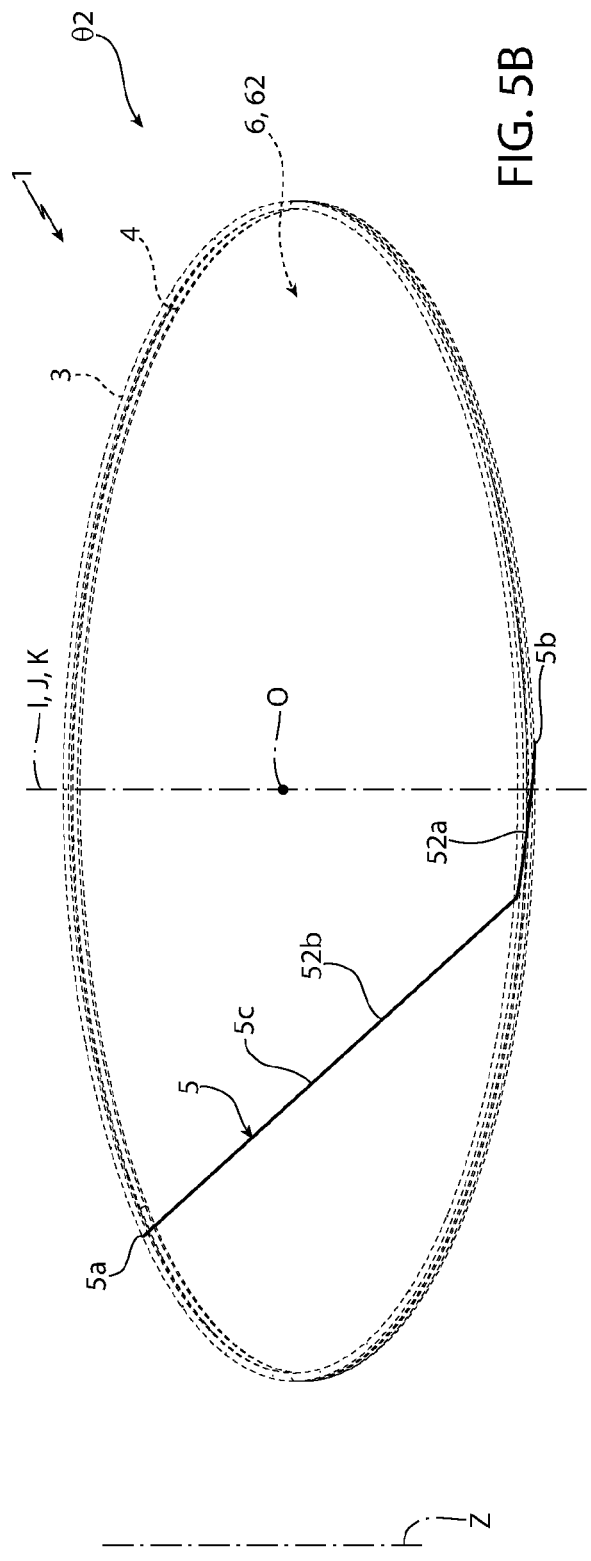

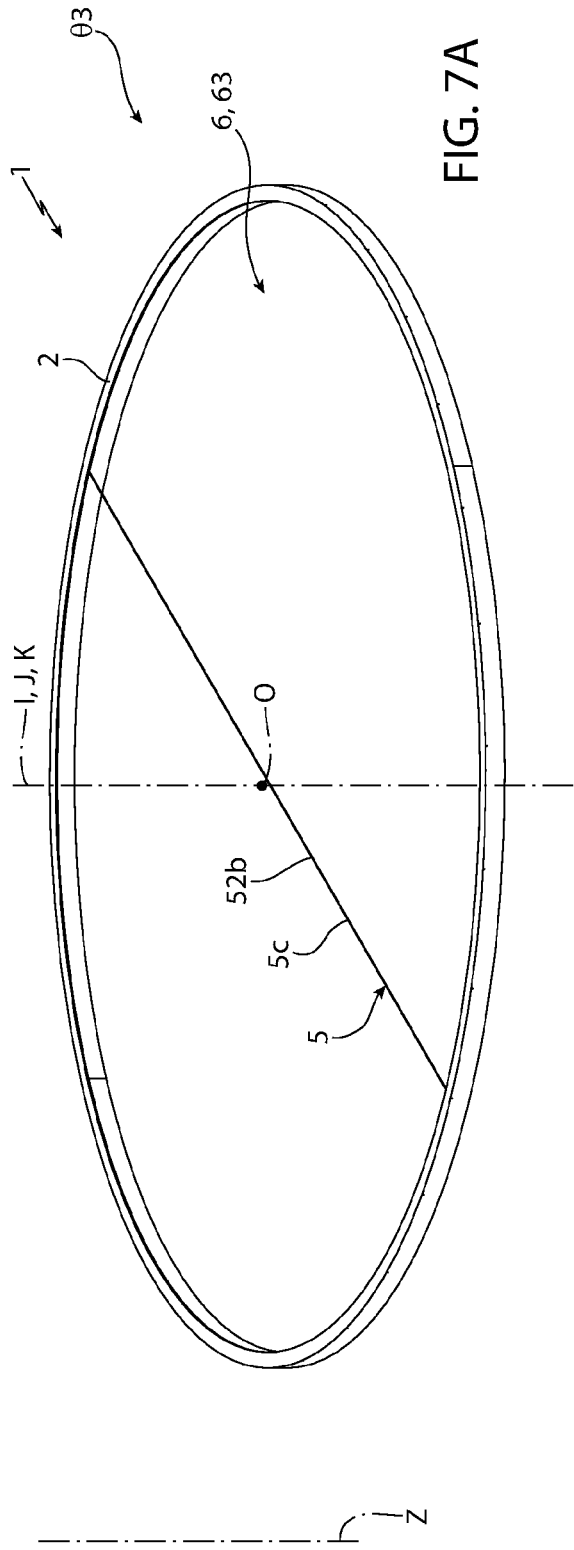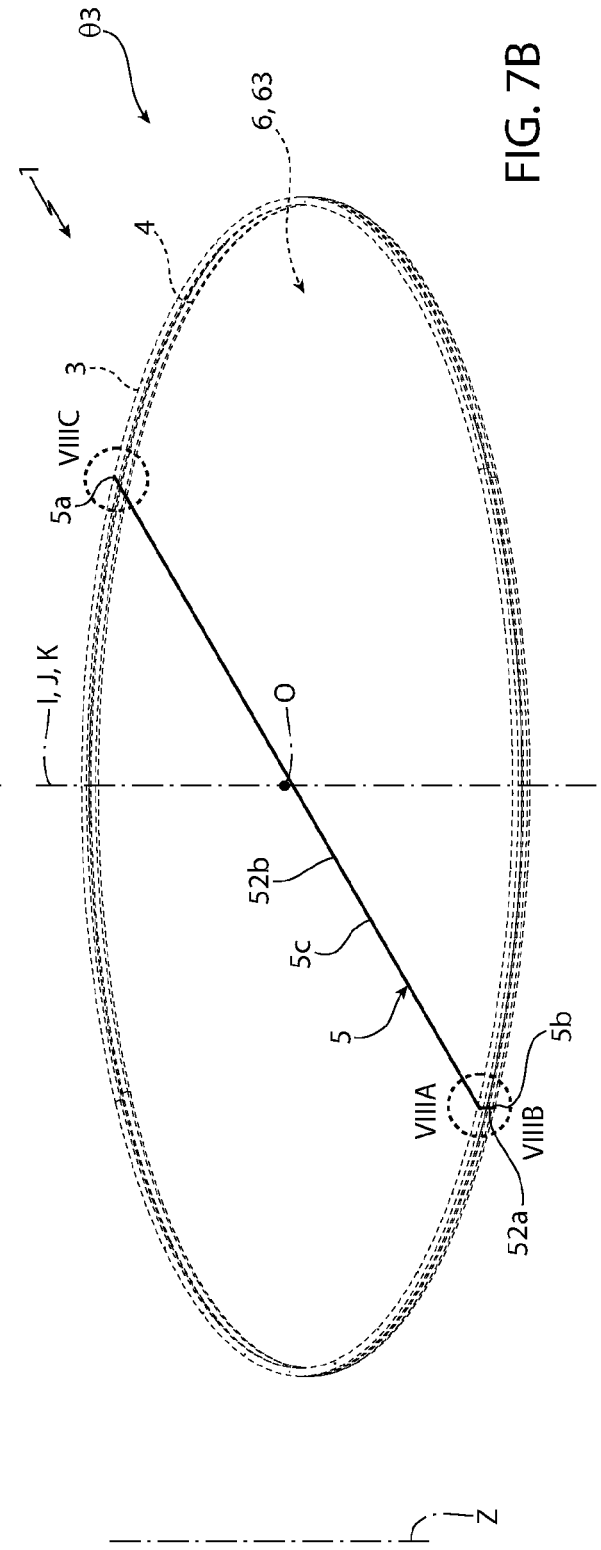

LOCKING DEVICE FOR AN AIRCRAFT

CROSS-REFERENCE TO RELATED APPLICATIONS

This Patent Application is a U.S. national stage of PCT International Application No. PCT/IB2022/056801 filed on Jul. 22, 2022, which claims priority from European Patent Application No. 21425037.5 filed on Jul. 23, 2021 and from Italian Patent Application No. 102022000015168 filed on Jul. 19, 2022, the entire disclosure of each of which is incorporated herein by reference.

TECHNICAL FIELD

The present invention relates to a locking device for an aircraft at a support surface. In particular, the present invention has a preferred, though not exclusive, application in a locking device for a drone.

BACKGROUND

The use of drones in various types of applications, both military and civil, is well established. In some of these applications, it is necessary for the drone to operate in harsh environments and/or in the presence of adverse weather conditions. It is therefore necessary that at the time of landing, the drone is fixed effectively and in a very short time, to prevent it from being able to detach itself from the ground in an undesirable manner and sustaining damages.

This need is particularly felt in the case in which drones are landed on the deck of a ship. In fact, the operations of fixing the drone in this case are complicated by the fact that the ship itself could be moving or in any case subject to the environmental conditions of the open sea.

Therefore, there is a need felt in the sector to lock the drone at the time of landing quickly and reliably to a support surface.

At the same time, it is necessary for the drone to be able to resume flying when necessary, quickly and efficiently.

SUMMARY

Aim of the present invention is the realization of a locking device for an aircraft, which allows to meet in a simple and economical way at least one of the aforesaid needs.

The aforesaid aim is achieved by the present invention, as it relates to a locking device as defined in claim 1.

BRIEF DESCRIPTION OF THE DRAWINGS

An embodiment is described below for a better understanding of the present invention, provided by way of non-limiting example with reference to the accompanying drawings, wherein:

FIG. 1A is a perspective view of a locking device according to the present invention, with a perspective cutaway;

FIG. 1B is a detailed view of the perspective cutaway shown in FIG. 1A;

FIGS. 3A and 3B are two perspective views of respective details (IIIA and IIIB in FIG. 2) of the locking device in the first operating position;

FIG. 5A is a perspective view of the locking device of FIG. 1A in a second operating position and with parts removed for clarity's sake;

FIG. 5B is a perspective and schematic view of the locking device of FIG. 5A with parts removed for clarity's sake;

FIG. 7A is a perspective view of the locking device of FIG. 1A in a third operating position and with parts removed for clarity's sake;

FIG. 7B is a perspective and schematic view of the locking device of FIG. 7A with parts removed for clarity's sake;

DESCRIPTION OF EMBODIMENTS

Figure 1C:
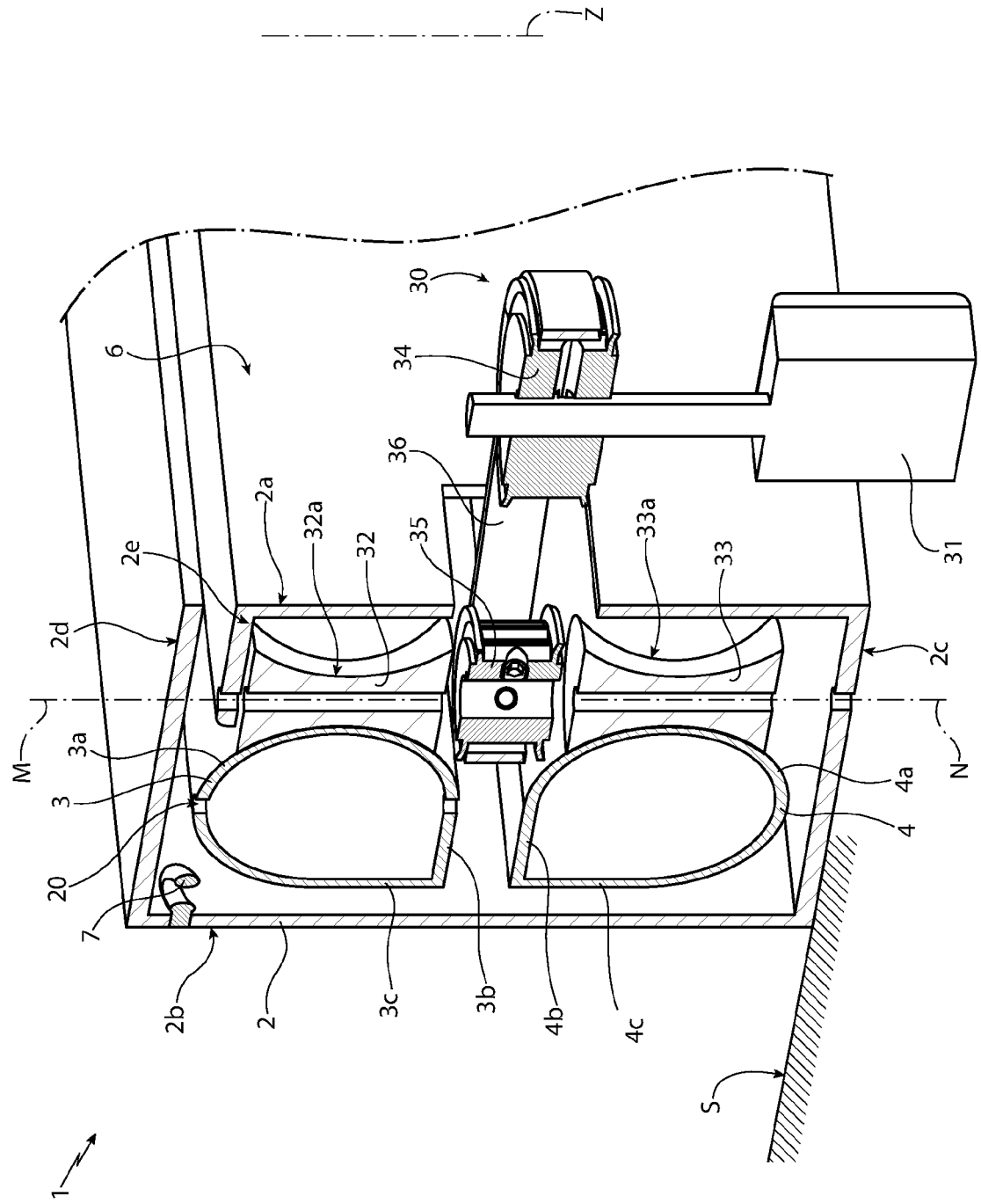
FIG. 1C is a section of the locking device of FIG. 1A along the plane Ia.
Figure 2:
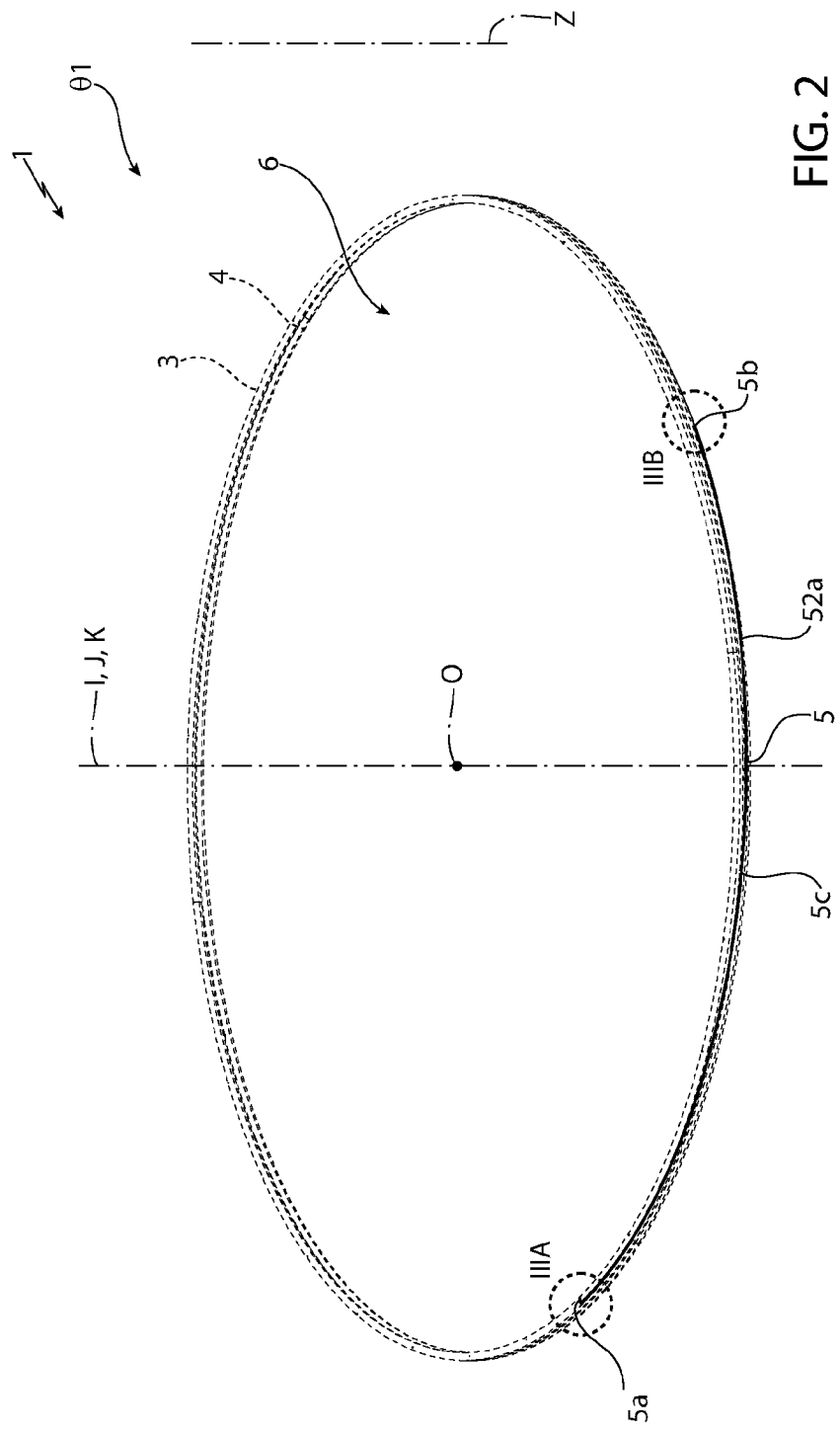
FIG. 2 is a perspective and schematic view of the locking device of FIG. 1A in a first operating position and with parts removed for clarity's sake.

With reference to FIG. 1A, numeral 1 denotes a locking device for an aircraft 100, in particular a drone. The locking device 1 is adapted to be fixed to a support surface S, for example the deck of a ship, in order to make the drone 100 integral with the support surface S at the end of the landing of the drone 100 at the support surface S.

Figure 8A:
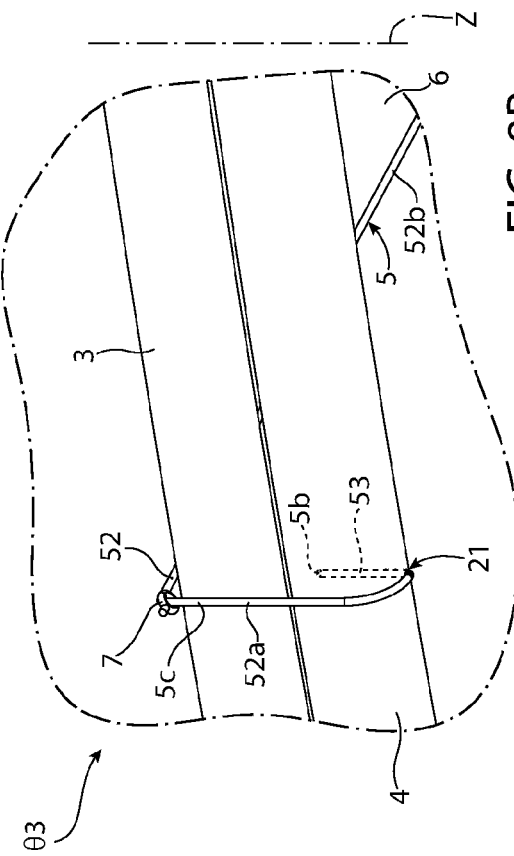
FIGS. 8A, 8B and 8C are perspective views of respective details (VIIIA, VIIIB and VIIIC in FIG. 7B) of the locking device in the third operating position.
Figure 8B:
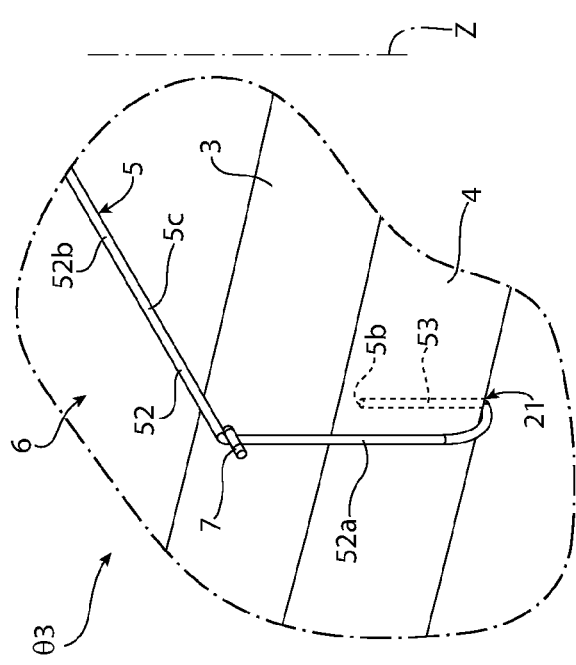
Figure 8C:
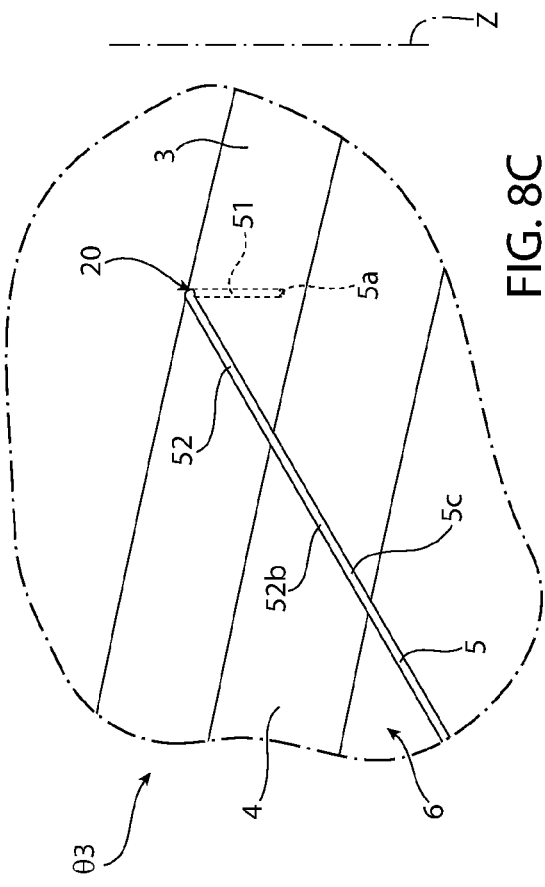

The locking device 1 comprises:

a body 2 adapted to be fixed to the support surface S;

a ring 3 and a ring 4 rotatable automatically the one with respect to the other with respect to a rotation axis I between an angular position $\theta1$ (FIGS. 1A to 4) and an angular position $\theta3$ (FIGS. 7A, 7B and 8) and superimposed on each other parallel to the rotation axis I; and a plurality of cables 5 each connecting the ring 3 to the ring 4 in an operational manner.

The rings 3 and 4 are contained within the body 2 (FIG. 1B). In detail, the rings 3 and 4 are movable with respect to the body 2 and remain completely inside the body 2 during the rotations around the rotation axis I.

Preferably, the relative rotation of the rings 3 and 4 between the angular position $\theta1$ and the angular position $\theta3$ corresponds to an angle lower than 180°. In the embodiment shown, the relative rotation of the rings 3 and 4 between the angular position $\theta1$ and the angular position $\theta3$ corresponds to an angle of 165°.

It is possible to define a direction Z of the locking device 1, which is defined by the rotation axis I. This direction Z is oriented perpendicular to the support surface S, when the locking device 1 is fixed to the support surface S.

The rings 3 and 4 enclose an area 6 for the landing of the drone 100. In detail, the locking device 1 is adapted to interact with the drone 100 when it is arranged at the area 6 and occupies at least part of the extension of the locking device 1 along the direction z. In greater detail, the locking device 1 is adapted to interact with the drone 100 since the latter is not yet in contact with the support surface S. Preferably, the area 6 has an extension of the order of tens of square meters, for example of 25 m².

Figure 9:
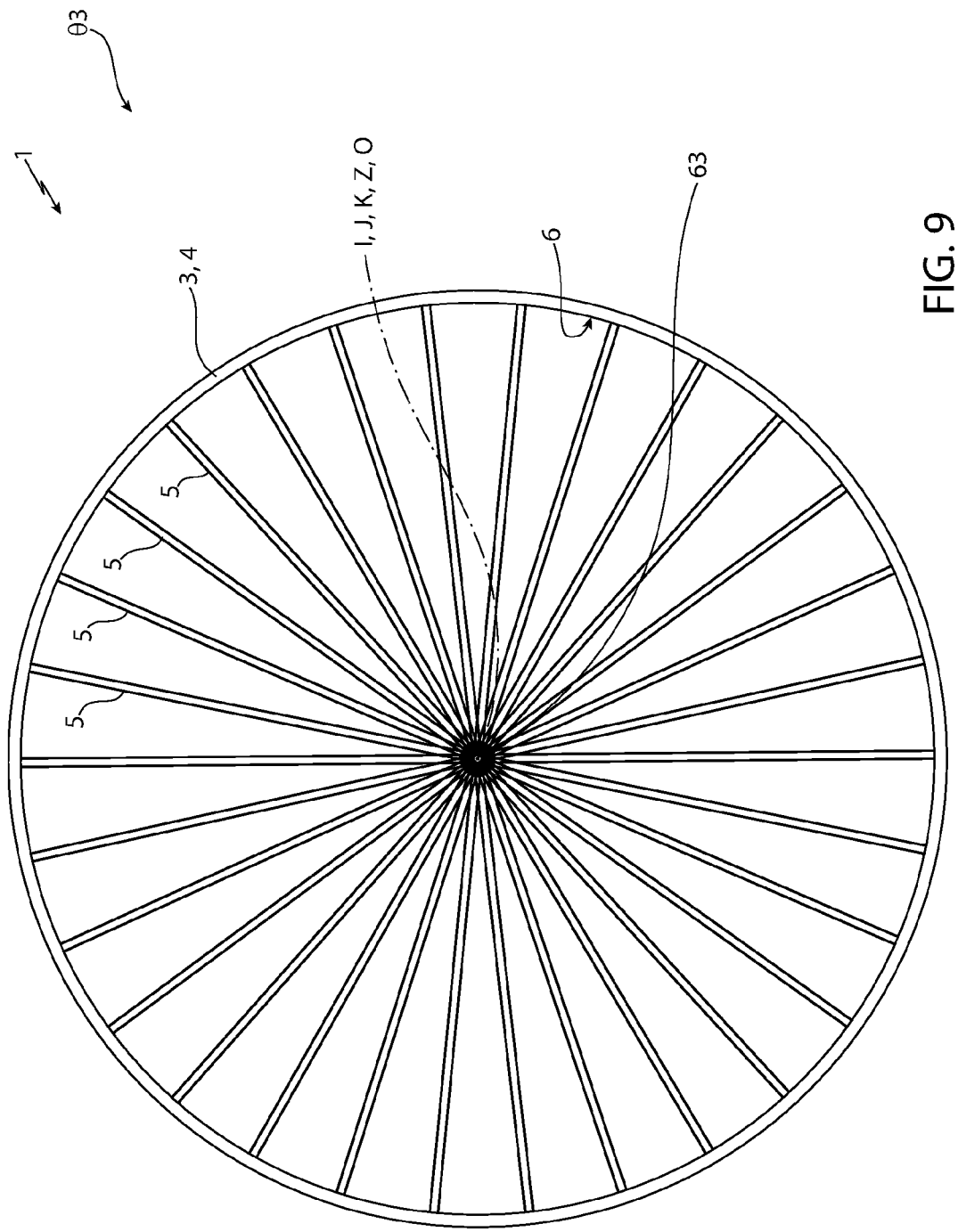
FIG. 9 is a top view of the locking device of FIG. 1A in the third operating position.

The locking device 1 is positionable in:

an unlocking position, wherein the rings 3 and 4 are in the angular position θ1 and the cables 5 are spaced from the area 6 (FIG. 1A); or a locking position, wherein the rings 3 and 4 are in the angular position θ3 and the cables 5 occupy a region 63 of the area 6 (FIG. 9).

In the locking position, the cables 5 are adapted to cooperate in contact with the drone 100, to constrain it with respect to the support surface S. In particular, in the locking position, the cables 5 are adapted to completely surround the drone 100, exerting a throttling action on the outer surfaces of the drone 100. Conversely, in the unlocking position, the cables 5 are adapted to be spaced apart from the drone 100 and allow its movement with respect to the support surface S.

More particularly, when the drone 100 is positioned completely within the area 6 and the locking device 1 is in the locking position, the cables 5 are adapted to exert on the drone 100 a system of forces, which limits its movements. The tangential component of these forces has a self-centring function, i.e. it is such as to shift the drone 100 towards the geometric centre O of the locking device 1 when the drone 100 lands in a peripheral region of the area 6.

Figure 10:
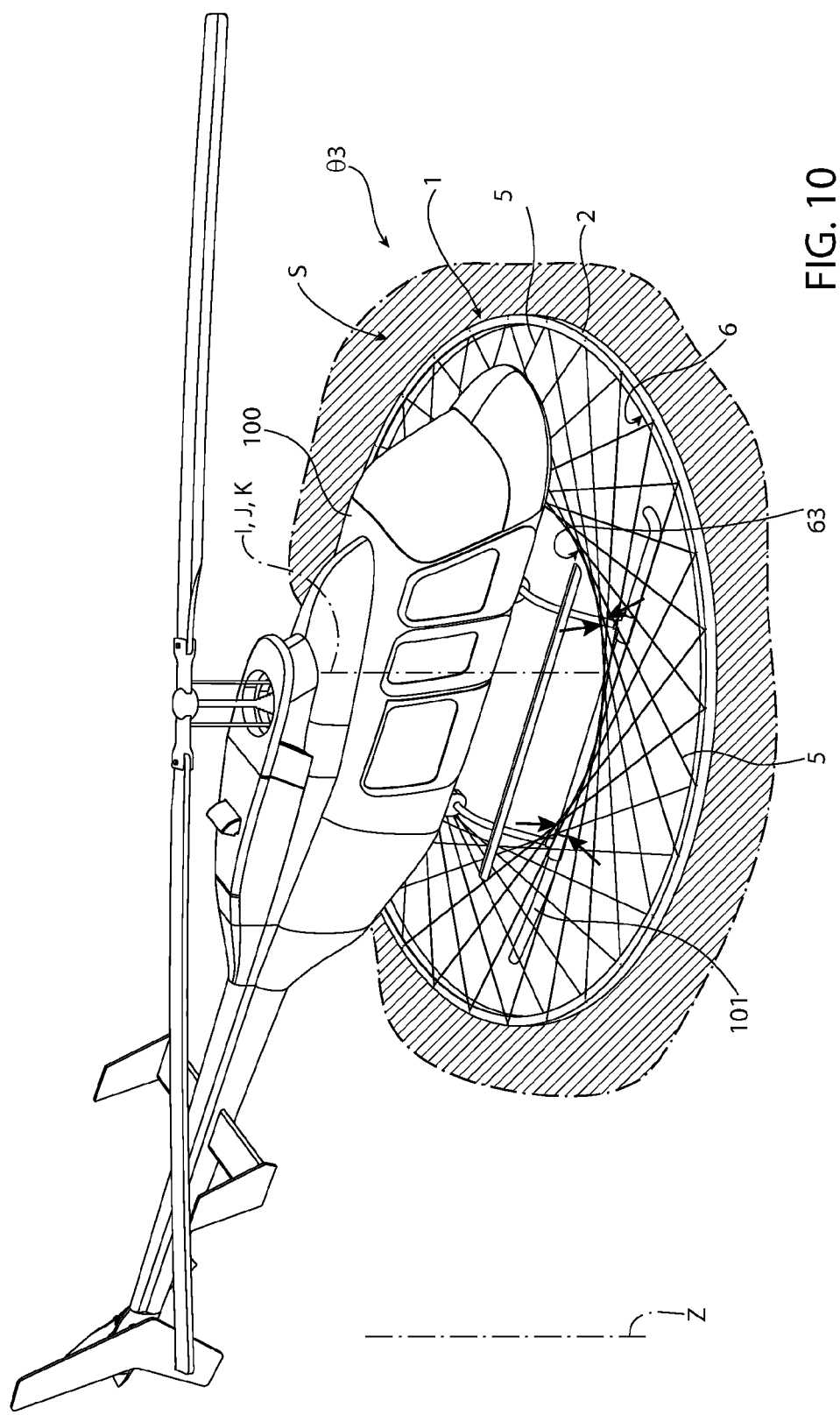
FIG. 10 is a perspective view of the locking device during interaction with a drone.

The forces exerted by the cables 5 on the drone 100 also have a vertical component, i.e. directed parallel to the axis I. This vertical component is due to the frictions between the cables 5 and the drone 100 and to the conformation of the drone 100. More particularly, as shown in FIG. 10, the cables 5 are adapted to interact with the landing skids 101 of the drone 100.

The intensity of the forces exerted by the cables 5 on the drone 100 further increases as the rings 3 and 4 rotate the one with respect to the other in the direction of rotation oriented from the angular position θ1 to the angular position θ3.

Preferably, the cables 5 could be made of very high-molecular-weight polyethylene.

In the embodiment shown, the rings 3 and 4 have circular cross-section in a plane orthogonal to the rotation axis I.

The rings 3 and 4 are concentric with each other parallel to the rotation axis I. In greater detail, the rings 3 and 4 define respectively an axis J and an axis K, which coincide with each other and with the rotation axis I.

As shown in FIG. 1A, the ring 4 is closer to the support surface S than the ring 3. At the same time, the rings 3 and 4 are spaced from each other parallel to the direction Z.

Preferably, furthermore, the rings 3 and 4 are identical to each other.

As shown in FIG. 1C, the rings 3 and 4 are of the tubular type. Specifically, the cross-section of the rings 3 and 4 according to a plane passing through the rotation axis I (for example, the plane Ia in FIG. 1A) comprises (FIG. 1C):

a curved portion 3a, 4a;
a flat portion 3b, 4b; and
a flat portion 3c, 4c.

In detail, the flat portion 3b is contiguous with the flat portion 3c and the flat portion 4b is contiguous with the flat portion 4c. The curved portions 3a, 4a, moreover, face the rotation axis I, the flat portions 3b and 4b face each other and the flat portions 3c and 4c are opposite the rotation axis I with respect to the respective curved portions 3a, 4a.

Preferably, moreover, the flat portions 3b and 4b are directed perpendicularly or substantially perpendicular to the direction Z; the flat portions 3c and 4c are directed parallel or substantially parallel to the direction Z.

In other words, the cross-section of the rings 3 and 4 according to a plane passing through the rotation axis I has a teardrop shape.

Preferably, the rings 3 and 4 are made of carbon.

The body 2 also has an annular shape in a plane perpendicular to the rotation axis I and is concentric to the rings 3 and 4 (FIG. 1A). In detail, the body 2 comprises (FIG. 1C):

a radially inner wall 2a with respect to the rotation axis I, cylindrical in shape;
a radially outer wall 2b with respect to the rotation axis I, also cylindrical in shape;
a base wall 2c adapted to be facing or in direct contact with the support surface S; and
a cover wall 2d, opposite the base surface 2c along the rotation axis I.

The base wall 2c is flat and extends between the radially inner wall 2a and the radially outer wall 2b radially with respect to the rotation axis I.

The cover wall 2d extends cantilevered from the radially outer wall 2b in the radial direction with respect to the rotation axis I toward the radially inner wall 2a. In particular, the cover wall 2d extends along the entire radial distance between the radially inner wall 2a and the radially outer wall 2b, but is spaced from the radially inner wall 2a parallel to the direction Z.

The body 2 further comprises a flap 2e which extends cantilevered from the radially inner wall 2a towards the radially outer wall 2b.

In other words, the cross-section of the body 2 in a plane passing through the rotation axis I has the shape of a G (FIG. 1C).

The body 2 comprises a plurality of grommet elements 7 spaced from each other in a circumferential direction with respect to the rotation axis I. Since the grommet elements 7 are part of the body 2, which is fixed to the support surface S, the grommet elements 7 are fixed with respect to the support surface S.

The grommet elements 7 are arranged at a surface of the body 2 facing the rings 3 and 4. In greater detail, the grommet elements 7 are arranged at the radially outer wall 2b, on a surface of such radially outer wall 2b facing the radially inner wall 2a (FIG. 1C).

In the embodiment shown, each grommet element 7 comprises a ring, which is adapted to be slidably crossed by a respective cable 5.

In the following, reference will be made to only one cable 5, since the structure and the arrangement of the cables 5 is the same for all the cables 5 in each of the operating positions of the locking device 1. It should be noted that FIGS. 2, 3A, 3B, 5A, 5b, 7A, 7B, 8A, 8B and 8C show only one cable 5 for clarity purposes. However, the locking device 1 shown in the above figures is to be understood as comprising a plurality of cables 5.

The cable 5 comprises:
an end 5a fixed to the ring 3 (FIG. 3A);
an end 5b opposite the end 5a and fixed to the ring 4 (FIG. 3B); and
an intermediate portion 5c, which extends between the end 5a and the end 5b.

In the embodiment shown, the cable 5 extends partly inside the ring 3, partly inside the ring 4 and partly outside the rings 3 and 4.

In detail, the ring 3 comprises a plurality of holes 20, which are each crossed by a respective cable 5 (FIG. 3A). The holes 20 are spaced from each other in a circumferential direction with respect to the axis J and are obtained at the curved portion 3a, on the side opposite the ring 4 (FIG. 1C). Preferably, the holes 20 are arranged at the same height as the grommet elements 7 parallel to the direction Z with respect to the base wall 2c.

Similarly, the ring 4 comprises a plurality of holes 21, which are each crossed by a respective cable 5 (FIG. 3B). The holes 21 are spaced apart from each other in a circumferential direction with respect to the axis K and are obtained at the curved portion 4a, on the side opposite the ring 3 (FIG. 1C).

The intermediate portion 5c of each cable 5 comprises, in turn:
  a first section 51, which extends inside the ring 3;
  a second section 52, which extends outside the rings 3 and 4; and
  a third section 53, which extends inside the ring 4.

Specifically, the end 5a is fixed to the ring 3 at the flat portion 3b. In detail, the end 5a is fixed at a region of the flat portion 3b inside the ring 3 and aligned with the hole 20 parallel to the direction Z.

The first section 51 extends between the end 5a and the relative hole 20. In detail, the first section 51 is parallel or substantially parallel to the direction Z.

Similarly, the end 5b is fixed to the ring 4 at the flat portion 4b. In detail, the end 5b is fixed at a region of the flat portion 4b inside the ring 4 and aligned with the hole 21 parallel to the direction Z.

The third section 53 extends between the end 5b and the relative hole 21. In detail, the first section 53 is parallel or substantially parallel to the direction Z.

The orientation and the positioning of the second section 52 depends on the relative angular position between the rings 3 and 4. The section 52 comprises, in turn:
  a portion 52a included between the respective hole 21 and the respective grommet element 7; and
  a portion 52b included between the respective grommet element 7 and the relative hole 20.

Figure 4:
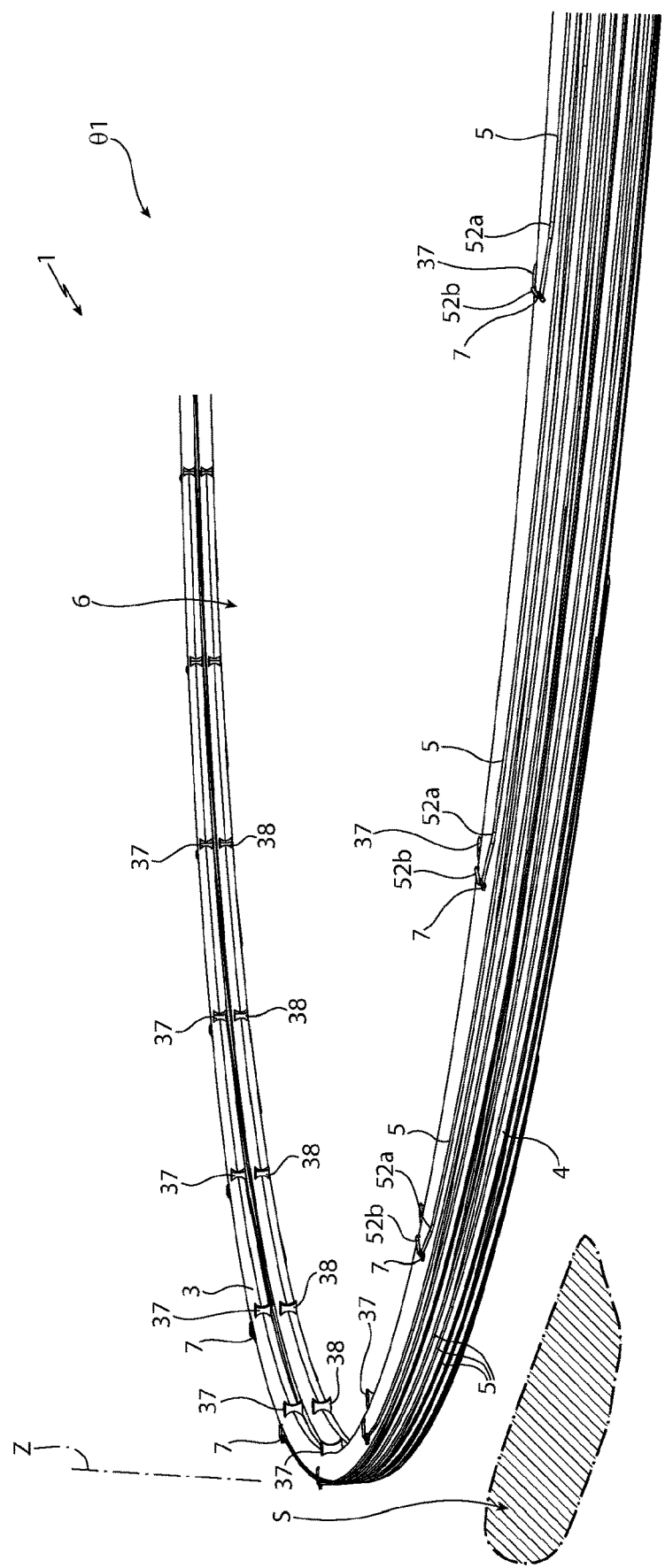
FIG. 4 is a partial perspective view of the locking device of FIG. 1A in the first operating position and with parts removed for clarity's sake.

As shown in FIG. 4, when the rings 3 and 4 are in the angular position $\theta 1$, the second section 52 of all the cables 5 is arranged in direct contact with the rings 3 and 4 on the side opposite the rotation axis I. Consequently, the cables 5 are spaced from the area 6 and the area 6 is fully usable for the landing of the drone 100.

When the rings 3 and 4 are in the angular position $\theta 3$, each hole 21 is aligned with a respective grommet element 7 parallel to the direction Z (FIGS. 8a and 8b) and the second sections 52 define respective chords of the circumference delimited by the radially inner wall 2a (FIGS. 7A and 7B). In particular, the portions 52a extend between the holes 21 and the respective grommet elements 7 parallel to the direction Z (FIGS. 8A and 8B) and the portions 52b occupy the region 63. By virtue of the arrangement of the cables 5, the region 63 has the shape of an annulus and is centred in the geometric centre O of the locking device 1 (FIG. 9).

In addition, the portions 52b defining the region 63 are coplanar or substantially coplanar with each other and arranged orthogonally to the rotation axis I.

Figure 6:
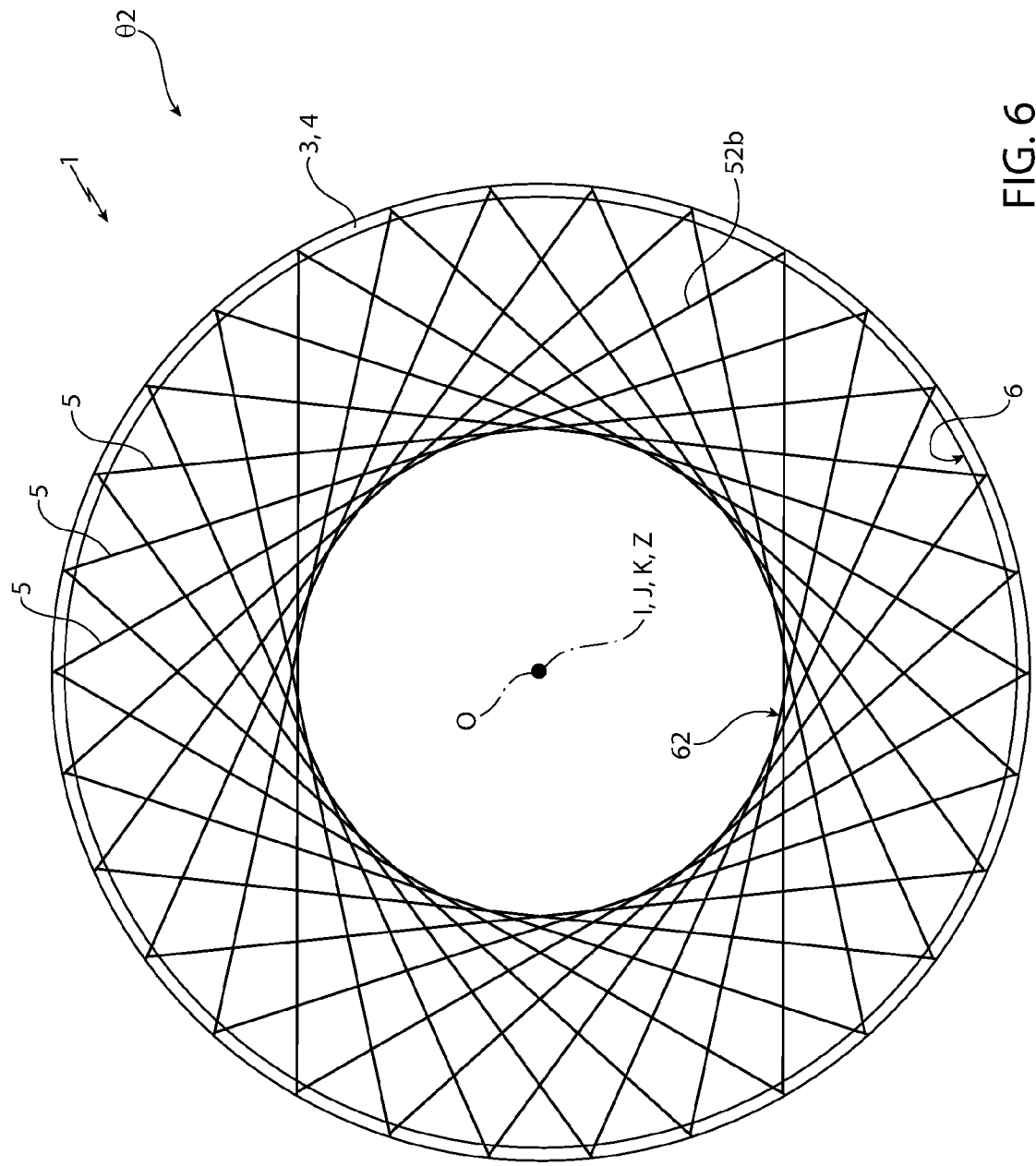
FIG. 6 is a top view of the locking device of FIG. 1A in the second operating position.

FIGS. 5A, 5B and 6 show the rings 3 and 4 in an angular position $\theta 2$ that is intermediate between the angular positions $\theta 1$ and $\theta 3$.

Also in the angular position $\theta 2$ the second sections 52 define respective chords of the circumference delimited by the radially inner wall 2a. However, each hole 21 is spaced in a circumferential direction from the respective grommet element 7, i.e. the grommet element 7 crossed by the same cable 5 that crosses the hole 21.

In detail, when the rings 3 and 4 are in the angular position $\theta 2$, the portions 52a rest against the rings 3 and 4 on the side opposite the rotation axis I along an angular sector of the rings 3 and 4 and the portions 52b extend at the area 6 (FIG. 5B). Consequently, the extension of the portions 52b at the area 6 when the rings 3 and 4 are in the angular position $\theta 2$ (FIG. 5A) is lower than the extension of the portions 52b at the area 6 when the rings 3 and 4 are in the angular position $\theta 3$ (FIG. 7A).

When the rings 3 and 4 are in the angular position $\theta 2$, the second sections 52 occupy a region 62 of the area 6, which has the shape of an annulus and is centred with respect to the geometric centre O (FIG. 6). In particular, the region 62 has a smaller extension than the region 63.

The rings 3 and 4 in the angular position $\theta 2$ may define a locking or unlocking position of the locking device 1, depending on the dimensions of the drone 100 occupying the area 6.

The locking device 1 further comprises actuating means 30 adapted to cause the relative rotation between the rings 3 and 4 (FIG. 1A). Said actuating means 30 are operationally connectable in a selective manner to the ring 3 or to the ring 4 to cause respectively the rotation of the ring 3 with respect to the ring 4 around the rotation axis I and vice versa.

As shown in FIGS. 1B and 1C, the actuating means 30 comprise:
  a motor 31, preferably of the electric type;
  a clutch pulley 32 rotatable around a rotation axis M and arranged in contact with the ring 3;
  a clutch pulley 33 rotatable around a rotation axis N and arranged in contact with the ring 4.

In particular, the rotation of the pulley 32 around the rotation axis M causes the rotation of the ring 3 around the rotation axis I; the rotation of the pulley 33 around the rotation axis N causes the rotation of the ring 4 around the rotation axis I.

The motor 31 is operationally connectable in a selective manner to the pulley 32 or the pulley 33 to cause respectively the rotation of the ring 3 or of the ring 4.

In the case shown, the pulleys 32 and 33 are carried by the body 2 and are rotatable with respect thereto (FIG. 1C). In detail, the pulley 32 is carried by the flap 2e and the pulley 33 is carried by the base wall 2c.

In addition, the pulleys 32 and 33 are aligned with other parallel each to the direction Z. More particularly, the rotation axes M and N are coincident with each other and are parallel to the rotation axis I (FIG. 1C).

The pulleys 32 and 33 are furthermore interposed between the rings 3 and 4 and the radially inner wall 2a radially with respect to the rotation axis I (FIGS. 1B and 1C).

The pulleys 32, 33 are axisymmetrical bodies with respect to the respective axes M and N and each comprise a respective radially outer surface 32a, 33a. The radially outer surfaces 32a, 33a are respectively in contact with the ring 3 and the ring 4.

The radially outer surfaces 32a and 33a have a shape corresponding to the outer shape of the rings 3 and 4, i.e. a spherical or substantially spherical and concave shape. Specifically, the radially outer surfaces 32a and 33a cooperate respectively with the curved portion 3a and the curved portion 4a.

The actuating means 30 further comprise (FIGS. 1B and 1C):
  a drive pulley 34, which is keyed directly on the drive shaft exiting the motor 31;
  a driven pulley 35, which is in an operational manner selectively connected with the pulley 32 or with the pulley 33; and
  a belt 36, which is wound around the pulley 34 and the pulley 35.

The locking device 1 further comprises a plurality of rollers 37 idly rotatable around respective rotation axes parallel to the rotation axis I and in contact with the ring 3 and a plurality of rollers 38, also idly rotatable around respective rotation axes parallel to the rotation axis I and in contact with the ring 4.

The rollers 37 and 38 are carried by the body 2 and are interposed between the rings 3 and 4 and the radially inner wall 2a radially with respect to the rotation axis I. The rollers 37 and 38 guide respectively the rotation of the rings 3 and 4 around the rotation axis I.

Preferably, the rotation axis of each roller 37 coincides with the rotation axis of a respective roller 38.

In the embodiment shown, the rollers 37 and 38 are identical to the clutch pulleys 32 and 33.

In particular, the pulley 32 and the rollers 37 support the ring 3 in a rotatable manner around the rotation axis I with respect to the body 2; the pulley 33 and the rollers 38 support the ring 4 in a rotatable manner around the rotation axis I with respect to the body 2.

Preferably, the clutch pulleys 32, 33 and the rollers 37, 38 are made of polyoxymethylene.

The motor 31 is electrically connected to an electrical power source, for example the electrical grid or the electrical generator of the ship on which the locking device 1 is installed. In addition, the locking device 1 could comprise a backup battery electrically connected to the motor 31.

The locking device 1 also comprises fixing means—not shown—adapted to constrain the locking device 1 itself to the support surface S. Preferably, the fixing means are of a releasable, i.e. non-permanent, type.

By way of example, the locking device 1 comprises three supports at the body 2, screwable at the support surface S and arranged at 120° to each other with respect to the rotation axis I.

The locking device 1 also comprises a manual release system—not shown—adapted to allow the shift of the locking device 1 itself to the unlocking position, for example in the event of failure of the actuating means 30.

The locking device 1 may further comprise coloured light indicator—not shown—adapted to indicate whether the locking device 1 is in the locking position and is engaged by a drone 100, or if errors are present.

The operation of the locking device 1 is described below starting from a condition in which the locking device 1 is in the unlocking position and the drone 100 is about to land at the area 6.

In the unlocking position, the rings 3 and 4 are in the angular position θ1 and the cables 5 are arranged in contact with the rings 3 and 4 on the side opposite the area 6 (FIGS. 1A to 4). Consequently, the area 6 is cleared and is ready to receive the drone 100.

When the drone 100 has landed at the area 6, the user commands the locking device 1 to shift to the locking position. Consequently, the rings 3 and 4 automatically rotate the one with respect to the other and shift towards the angular position θ3, passing through the angular position θ2. In particular, the ring 3 is placed in clockwise rotation around the axis I.

During the relative rotation between the rings 3 and 4, each end 5b moves in a circumferential direction closer to the respective grommet element 7, which is fixed, while each end 5a moves in a circumferential direction away from the respective grommet element 7. In greater detail, during the rotation, each cable 5 slides through the respective grommet element 7, the portion 52a is shortened and the portion 52b is progressively lengthened.

At the end of the rotation, the cables 5 define the region 63 and are tightened around the drone 100, locking it and making it integral with the support surface S.

When the drone 100 is ready to take off from the area 6, the user commands the locking device 1 to shift to the unlocking position. Consequently, the rings 3 and 4 rotate the one with respect to the other and return to the angular position θ1. In particular, the ring 4 is driven in counter-clockwise rotation around the axis I.

Examining the characteristics of the locking device 1 according to the present invention, the advantages it allows to obtain are evident.

In particular, since the unlocking device 1 can be shifted from the unlocking position to the locking position simply by rotating the rings 3 and 4 the one with respect to the other, the drone 100 can be locked quickly and reliably at the time of landing. At the same time, the unlocking device 1 allows the drone 100 to resume flying quickly and efficiently.

Since the region 63 has the shape of an annulus centred with respect to the geometric centre O, the cables 5 exert a self-centring action on the drone 100, that is, they tend to shift it towards the geometric centre O. This is particularly useful in the event that the drone 100 should land in a peripheral region of the area 6. Therefore, the locking device 1 allows effectively lock the drone 100 landed at any point of the area 6 and potentially with any orientation.

Since the actuating means 30 are selectively operationally connectable to the ring 3 or to the ring 4, it is possible to obtain the relative rotation of the two rings 3, 4, without having to rotate both rings 3, 4 at the same time with respect to the rotation axis I.

Since the rings 3 and 4 are made of carbon, the overall weight of locking device 1 can be limited.

By virtue of the claimed conformation of the body 2, the shift of the cables 5 during the shift of the locking device 1 between the unlocking position and the locking position is facilitated and the frictions between the cables 5 and the body 2 are minimised.

Finally, it is clear that modifications and variations can be made to the locking device 1 described and shown herein without thereby departing from the scope of protection defined by the claims.

The locking device 1 could be used to lock aircrafts other than drones, for example helicopters or convertiplanes.

In particular, the actuating means 30 could be adapted to achieve the simultaneous rotation of the rings 3 and 4 in respective opposite directions of rotation around the rotation axis I.

The actuating means 30 could comprise more than one motor 31. Furthermore, the transmission of the motion between the motor 31 and pulleys 32 and 33 could be achieved through transmission means other than the belt 36.

The invention claimed is:

1. A locking device for an aircraft, the locking device comprising:
    a body adapted to be fixed to a support surface;
    a first ring and a second ring rotatable the one with respect to the other with respect to a first rotation axis between a first angular position and a second angular position and superimposed on each other parallel to the first rotation axis; the first and second rings enclosing an area for landing of the aircraft and being contained within the body;
    a plurality of cables each of which connects the first ring to the second ring in an operational manner;
    wherein the locking device is positionable in:

an unlocking position, wherein the first and second ring are in the first angular position and the plurality of cables are spaced from the area; and in a locking position, wherein the first and second ring are in the second angular position and the plurality of cables occupy a region of the area; the plurality of cables being adapted to cooperate in contact with the aircraft in the locking position to constrain the aircraft with respect to the support surface, wherein the body comprises a plurality of grommet elements spaced from each other in a circumferential direction with respect to the first rotation axis;

wherein each of the plurality of cables comprises:
a first end fixed to the first ring;
a second end opposite the first end and fixed to the second ring; and
an intermediate portion, which extends between the first end and the second end;

wherein each of the plurality of cables passing through a respective the grommet element and being slidable through the respective grommet element when the first ring is rotated, in use, with respect to the second ring and vice versa.

2. The locking device of claim 1, wherein:
the first and second ring are concentric with each other and have a circular cross-section in a plane orthogonal to the first rotation axis; and
the region having the shape of an annulus centred with respect to the geometric centre of the locking device.

3. The locking device of claim 1, wherein the intermediate portion of each of the plurality of cables comprises, in turn:
a first section, which extends inside the first ring;
a second section, which extends outside the first and second ring; and
a third section, which extends inside the second ring;
the first ring comprising a plurality of first holes spaced from each other in a circumferential direction with respect to the first rotation axis and the second ring comprising a plurality of second holes spaced from each other in a circumferential direction with respect to the first rotation axis; each of the plurality of cables crossing a respective first hole and a respective second hole;
the second section comprising, in turn:
a first portion included between the respective second hole and the respective grommet element; and
a second portion included between the respective grommet element and the respective first hole;
wherein, in use, during the shift of locking device from the unlocking position to the locking position, the extension of the first portion of the plurality of cables decreases and the extension of the second portion progressively increases.

4. The locking device of claim 3, wherein the second section of the cables is arranged in direct contact with the first and second ring on the side opposite the first rotation axis when, in use, the first and second ring are in the first angular position.

5. The locking device of claim 1, further comprising actuating means adapted to cause the relative rotation between the first and second ring; the actuating means being selectively operationally connectable to the first ring or to the second ring to cause respectively the rotation of the first ring with respect to the second ring around the first rotation axis and vice versa.

6. The locking device of claim 5, wherein the actuating means comprise:
at least one motor;
at least one first drive pulley rotatable around a second rotation axis and arranged in contact with the first ring; and
at least one second drive pulley rotatable around a third rotation axis and arranged in contact with the second ring;
wherein the at least one motor is selectively operationally connectable with the first pulley or the second pulley to cause respectively the rotation of the first ring with respect to the second ring around the first rotation axis and vice versa.

7. The locking device of claim 1, wherein the first ring and the second ring are made of carbon and/or wherein the plurality of cables are made of very high-molecular-weight polyethylene.

8. The locking device of claim 1, further comprising:
first rollers rotatable in an idle manner with respect to the body around respective fourth rotation axes parallel to the first rotation axis and in contact with the first ring;
second rollers rotatable in an idle manner with respect to the body around respective fifth rotation axes parallel to the first rotation axis and in contact with the second ring;
wherein the first and second rollers are adapted to guide respectively the rotation of the first and second ring around the first rotation axis and to support them with respect to the body.

9. The locking device of claim 1, wherein the body comprises:
a radially inner wall with respect to the first rotation axis;
a radially outer wall with respect to the first rotation axis;
a base wall adapted to be facing or in direct contact with the support surface; and
a cover wall, opposite the base surface along the first rotation axis;
wherein the base wall is flat and extending between the radially inner wall and the radially outer wall radially with respect to the first rotation axis;
wherein the cover wall extends cantilevered from the radially outer wall radially with respect to the first rotation axis towards the radially inner wall and being spaced from the radially inner wall parallel to the first rotation axis;
a flap, which extends cantilevered from the radially inner wall towards the radially outer wall.

\* \* \* \* \*